(12) United States Patent
Ward

(10) Patent No.: X8575
(45) Date of Patent: Jan. 7, 1835

(54) GARMENTS, MEASURING & MARKING OUT COATS

(76) Inventor: Allen Ward

Allen Ward, of Philadelphia, Penn^a
Letters Patent

The schedule referred to in these Letters Patent, and making part of the same, containing a description in the words of the said Allen Ward, himself, of his improvement in the art of measuring and marking out Coats -

---

To all to whom these presents shall come: Be it known that I, Allen Ward, of the City & County of Philadelphia, in the State of Pennsylvania, have invented a new & useful improvement in the art of taking the measures for a coat, and in the method of setting down measures and in the application of measures for the purpose of marking out the bodies of coats, to fit the human shape - and that the following is a full & exact description of my said improvement - 1st I sketch or draw a model or diagram of a coat with curved lines, &c. similar to the blank model hereunto attached which is for the purpose of noting the measures in, as shown in the figured model accompanying the same. 2ndly I close my customers coat so that it may set close to his body, or I request him to take off his coat, and put on an elastic round about, or slip made of knit cloth, which a Tailor may keep for that purpose. 3rdly I make four dots or marks on his outside garment, one at the top of back seam or socket of the neck behind, one at or near the prominent point of his shoulder blade behind the arms, and one at the bottom of the back seam, at the hollow of the back, and another at his side near the pap or nipple, say about three or four inches below and a little front of the arm pit, for one of medium size - I proceed in the third place to apply the end of a tape inch measure at the top of the back seam or socket of the neck, and measure the distance from thence to the dot at the most prominent point of the shoulder blade behind the arms, or say to the second dot - This measure I note down, as in the model below, which is figured according to whatever my customer shall prove to measure, see 10, at the back seam, near the end of the sweep which extends to the blade bone. 4thly I note the length of the waist, or to the hollow of the back, say, to the third mark or dot for length of waist see the model noted 17½, and at the same time, I note the length of the skirt, as shown by the figures below the model, see 41 -
5thly I then note the distance across from the back seam, to the dot at the point of the blad-bone, and set it down, as in the model, or according to what the custom-
er shall measure see 3 3/4. 6th I measure from the mark or dot below the arm
pit, to the dot at the bottom of backseam, or hollow of the waist, bringing the meas-
ure strap round in the form of a screw, and note the distance, see 10 1/2 marked
on the curve at the bottom of backseam. 7th I then measure from the same dot
below the arm pit, to the mark or dot at the blade-bone and note this distance
on the cross curve below the arm pit, see 8 3/4. 8th I then measure from the same
mark at the side to the dot at the top of back seam or socket of the neck, lead-
ing the measure gently up behind the arm, and note this distance on the curve at
the top of back seam, see 16 1/2. 9th I take the measure from the dot at the side to
the arm pit, or say, to the nearest point at the bottom of scye, or arm hole, and
make an allowance for seams, & for raising the arm, so as to avoid wringing the
coat, and note this measure on diagram, as shown at the bottom of scye, see figure
3 1/2. 10th I now go to the front of my customer, and take six measures from the
aforesaid mark or dot at the side - one to the flap line or bottom of the side
body, see 5, marked on the curve - one to the bottom of the lappell seam, or say,
to bottom of the coat, see 10 - one to the front of breast see 6 - one to the throat or
neck-gore of the coat, see 11 1/2 - one to the dot at the top of back seam, or sock-
et of the neck, leading the measure up the front of breast, see 15 1/4 and one
to the dot at the shoulder-blade, leading the measure front and over the
point of the shoulder, see 19, on the cross of the far back. I set down or note
these measures, each on its respective line or curve. This I do for the purpose
of avoiding mistakes. I then measure the circumference of the customers
breast, under his coat, and note the one half of what he measures on the
line or curve which runs from the top of the neck-gauge upwards, see 18.
I next take the measure of the customers waist, in like manner, and note
the half thereof on the curve which represents the button mark, see 16 near
the front at bottom of breast and lastly, I measure round the shoulder joint
over the coat, for the size of the scye, and top of the sleeves. I note the full
circumference thereof in the arm hole of the model, see 17 1/2. The sleeves of the
coat may be measured for, in the usual way. There are certain measures
in the above described method, which I do not claim the discovery of, nor
do I wish them embraced in my Patent - namely, those taken from the top of back seam to the length of the waist and skirt. Also that taken from top
of backseam to the point of blade-bone, and each of the circumference measures.
I claim only the method of setting down these to avoid mistakes, by means of
diagrams or models. But all the measures taken from the dot or point below the
bottom of scye, I claim as my discovery, as well as the application of them –
The application is as follows – after I cut out the back of a coat, as fashion or
fancy may dictate, I make three dots on the back, one at the top of the back
seam, one at the point of the blade-bone which I find by measure, and one
at the length of the waist or hollow of the back, say at 17½ or what the measure
may call for, and then I place the back on the cloth, and mark the shape of
the side-seam of the back, or only a part of it will do, opposite the blade bone:
and while the back lies in this position I look to my measure as taken from
the blade bone to the dot or cross below the arm-pit, & with this length of measure
I cast a curve towards the front, the pivot being at the dot at the blade bone
I then look to my measure as taken from the side dot to the hip or hollow
of the waist, and with it cast another sweep pivoted at the mark for hollow
of the waist accross the sweep last made, and the crossing of which will give
the point at the side below the arm pit. I then make the cross below the arm
pit my pivot and cast nine sweeps or slurs, 1st by the length of measure
as taken from the dot at the side, so as to cross the top of the nigh back seam.
2nd so as to cross the bottom of the nigh back seam. 3d towards the armpit.
4th towards the flapp – 5th towards the bottom of breast – 6th towards the front
of chest – 7th towards the chin or neck gorge – 8th towards the far top of back
seam accross the cloth – 9th towards the blade bone on the cloth under the
far back above the scye: in this last I confine the measure at front of scye
for a pivot, and shorten the sweep a fraction less to allow for the stretching
of the scye: each of these sweeps to be governed according to their respective
measures, as taken from the aforesaid dot at the side of the customer. I
generally prefer measuring the left side but in some instances I measure
the right side also, and then divide the difference between the two
measures, or cut each back and fore part to suit their respective measures
this last method is only necessary in case of deformity. but to complete
the application of the measure while the back lies in the first position, and the cloth being marked by the shape of the side seam of the back, I then stick
a pin, or hold the point of my finger on the dot at the blade-bone for a pivot
and move the top of the back towards the fore parts, until it shall rest on the slin
or curve, I there let the back rest, until I cast a curve or sweep by the half
circumference of the breast measure, making the near top of the back seam
my pivot throwing the sweep by one inch less than the half circumference of
the breast, this sweep must cross the sweep at the far top of back seam, and
the cross of these two sweeps will pitch the shoulders of coats more forward
for crooked, and backward, for straight forms — I then mark at the top of the
side seam, and remove the back, and form the side seam at top to suit
the blade-bone according to the measure. I then lay the top and bottom of
the back seam dots, so as to reach their respective curves without diminishing the
quantity of cloth which ~~which~~ was allowed for the blade-bones, except the cus-
tomer shall be of verry stooping form in the neck & shoulders, in which case the
back seam should have been cut convex or rounding to suit the form of the
customers back, and while the back of his coat lies in this position, shape the lower
part of the side seam, and place the hip rather short of what the measure calls
for at bottom, as the flap seams will, if much curved, reach beyond the measure
and will let the hip fly off or sit loose if not cut within the measure.
I proceed to form the shoulder seam of the foreparts, by that of the back — I place
the top of the back to the far cross, as in the model, and place the back in such
a position, as will bring the dot for the blade bone, which was marked on the back
to rest on the curve above the scye, and while the back lies in this position, I
mark the shoulder seam of the fore parts, rather more curved than that of the
back. I then find the bottom of scye by the measure as taken from the dot
or cross, at the side to the armpit, and then mark out the scye proving it by
the measure which was taken round the shoulder joint — the rest of the coat
may be formed in the usual way, as heretofore explained or exemplified
in the diagram below.

Allen Ward

Witnesses
J. Badger
Danl. D. Lippard